United States Patent [19]

Yasue et al.

[11] 4,174,797

[45] Nov. 20, 1979

[54] SPARE WHEEL HOLDING APPARATUS

[75] Inventors: Setsuo Yasue, Gifu; Tomio Yamamoto, Aichi, both of Japan

[73] Assignee: Sankokiki Kabushiki Kaisha, Inazawa, Japan

[21] Appl. No.: 913,870

[22] Filed: Jun. 8, 1978

Related U.S. Application Data

[62] Division of Ser. No. 811,865, Jun. 30, 1977, abandoned.

[30] Foreign Application Priority Data

Jul. 1, 1976 [JP] Japan ................... 51-78020

[51] Int. Cl.$^2$ .......................................... B62D 43/04
[52] U.S. Cl. ............................ 224/42.21; 224/42.23; 414/463
[58] Field of Search ............... 224/42.12, 42.21, 42.23, 224/42.28; 214/451, 452, 453, 454; 414/463, 464, 465, 466

[56] References Cited

U.S. PATENT DOCUMENTS

| | | | |
|---|---|---|---|
| 1,672,356 | 6/1928 | Wasserfallen | 224/42.21 X |
| 1,813,094 | 7/1931 | Appel | 224/42.23 X |
| 3,539,152 | 11/1970 | Paul | 214/451 X |
| 3,650,424 | 3/1972 | Dumas | 214/454 |
| 4,047,629 | 9/1977 | Klein | 214/451 |
| 4,059,197 | 11/1977 | Iida | 214/451 |

FOREIGN PATENT DOCUMENTS

| | | | |
|---|---|---|---|
| 2255613 | 5/1974 | Fed. Rep. of Germany | 414/463 |
| 1416531 | 9/1964 | France | 224/42.23 |

Primary Examiner—Stephen G. Kunin
Assistant Examiner—Winston H. Douglas
Attorney, Agent, or Firm—Dennison, Dennison, Meserole & Pollack

[57] ABSTRACT

An apparatus for holding a spare wheel under the chassis of a motor vehicle in a horizontally suspended fashion, including a wheel holder supported at its one end on the outer surface of one longitudinal chassis member for both vertical and horizontal rotation to rotate its other end vertically and horizontally. A pin depends from a supporting member on the outer surface of the longitudinal chassis member and is connected to the one end of the wheel holder to permit at least horizontal rotation of the wheel holder. The vertical rotation of the wheel holder is effected by a rotative connective mechanism provided either at the one end of the wheel holder or between the pin and the one end of the wheel holder. A winch mechanism is provided for raising and lowering the other end of the wheel holder. According to one embodiment, the winch mechanism is positioned on the outer surface of the longitudinal chassis member, so that the wheel holder extends in parallel to the longitudinal chassis member for 90° horizontal rotation to project its other end outwardly relative to the chassis. In a different embodiment, the winch mechanism is provided on the outer surface of another longitudinal chassis member, so that the wheel holder extends perpendicularly to the longitudinal chassis members for 180° horizontal rotation to project its other end outwardly relative to the first mentioned longitudinal chassis member.

8 Claims, 8 Drawing Figures

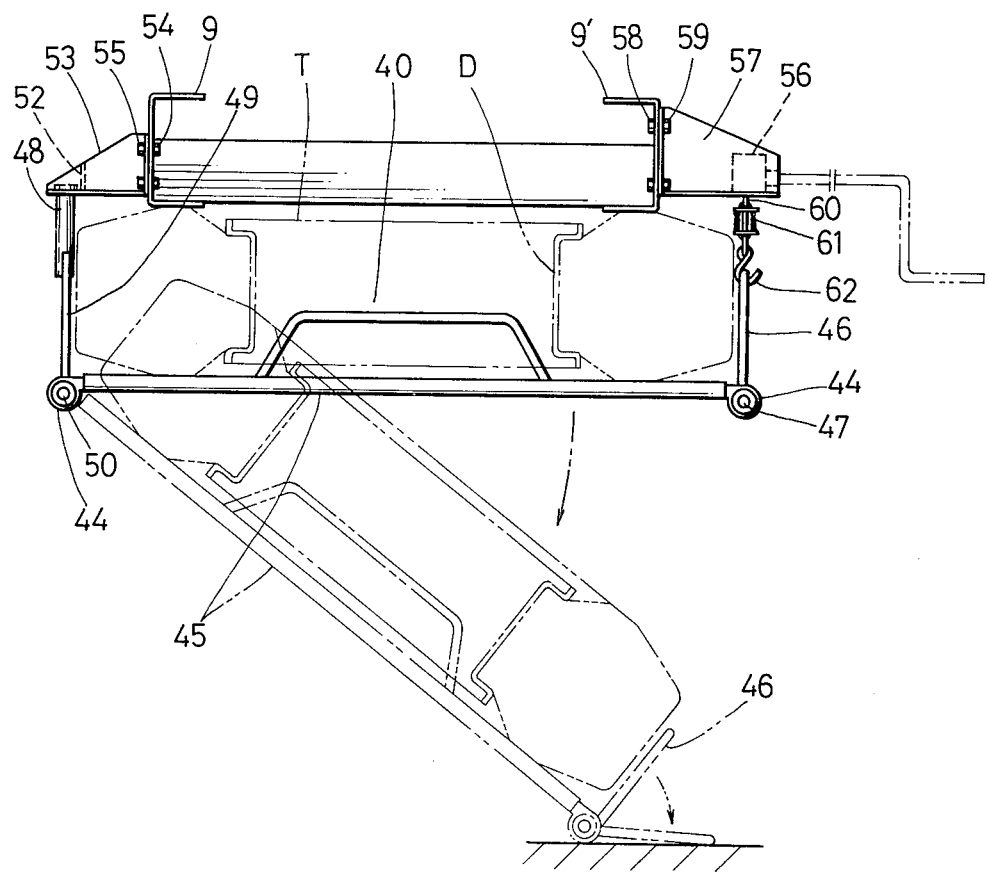

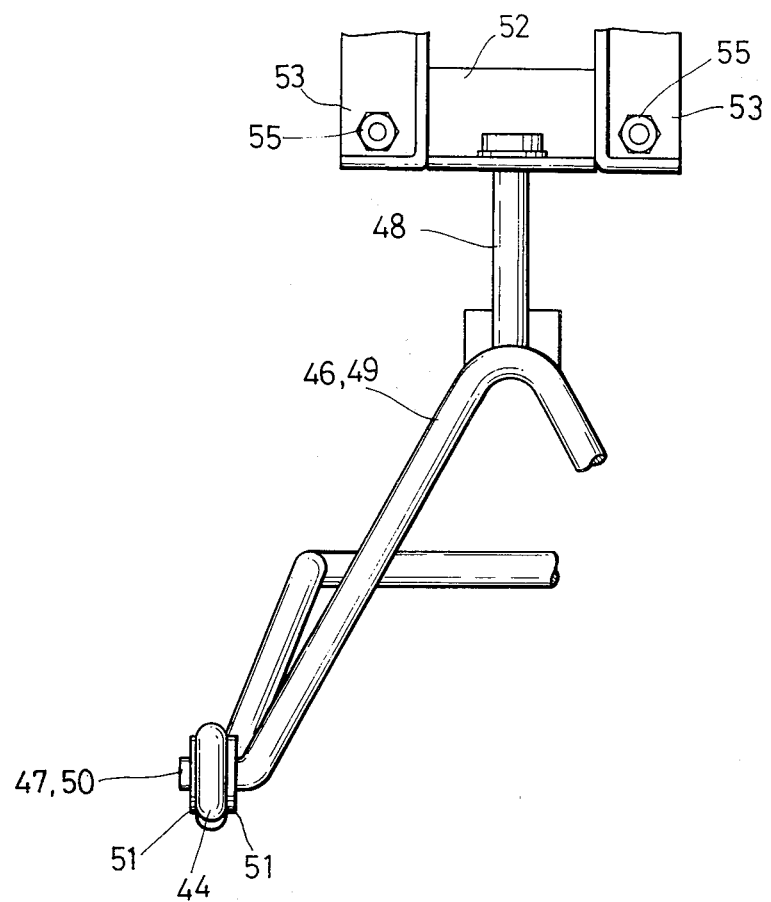

SPARE WHEEL HOLDING APPARATUS

This is a division of application Ser. No. 811,865, filed June 30, 1977, now abandoned.

This invention relates to a spare wheel holding apparatus for a motor vehicle, including an elongate wheel holder pivotally carried at one end on the underside of the chassis of the motor vehicle to raise or lower its opposite end to hold the wheel under the chassis in a horizontally suspended fashion or release it from the apparatus.

There is known an apparatus of the sort described which comprises a vertically rotatable wheel holder extending longitudinally of the chassis of a motor vehicle and having one end pivotally supported on the underside of the chassis, while the opposite or free end of the holder is located in the vicinity of the rear end of the chassis. The apparatus further includes a winch mechanism supported on the underside of the chassis at the rear end thereof and having a chain or wire rope fastened to the free end of the holder to raise the free end of the holder to hold a spare wheel on the wheel holder under the chassis in a horizontally suspended fashion. The wheel holder is tilted downwardly to lower its free end onto the ground in order to release the spare wheel or receive a new spare wheel when it is empty. The problem in this connection is that when the wheel holder is tilted, its free end is displaced forwardly toward the front end of the chassis despite its location at the rear end of the chassis when the wheel holder remains in a horizontal position to hold the spare wheel under the chassis. This displacement of the wheel holder makes it a considerably hard job to load or unload the apparatus, since only a narrow space which is less in height than the diameter of a spare wheel is available between the chassis and the ground. To provide a solution to this problem, there has been proposed a device including a longitudinally movable wheel holder to allow its free end to project outwardly beyond the rear end of the chassis, but this feature necessarily makes the device highly complicated in construction and unacceptable for practical use.

In view of the aforementioned disadvantages of the apparatus known in the art, it is an object of this invention to provide a novel and improved spare wheel holding apparatus for a motor vehicle which is simple in construction and easy to use or operate, permitting its loading and unloading operation to be readily accomplished without being subjected to any restriction of the sort heretofore imposed by the vehicle. This object is attained by this invention which provides a spare wheel holding apparatus including a wheel holder having one end pivotally supported on the outer surface of one of the longitudinal members of the chassis of a motor vehicle to render its opposite or free end rotatable both vertically and horizontally. More particularly, the one end of the wheel holder is connected to a vertically disposed pin pivotally supported by a supporting member secured to the outer surface of the longitudinal member of the chassis or by a like member carried on a bracket secured to the outer surface of the longitudinal member of the chassis. The wheel holder is tilted downwardly or rotated vertically from its horizontal position under the chassis, and then horizontally rotatable to allow its free end to project outwardly beyond the lateral extremity of the vehicle, so that the entire work of loading the apparatus with a spare wheel or unloading it, as the case may be, can easily be performed outside of the vehicle without requiring anybody to enter the narrow space under the chassis.

The foregoing and other objects, novel features and advantages of this invention will become apparent from the following detailed description and the accompanying drawings, in which:

FIG. 7 is a side elevational view of the apparatus shown in FIG. 6; and

FIG. 8 is a fragmentary, enlarged front elevational view of the apparatus shown in FIG. 6.

The invention will now be described in detail with reference to a couple of its embodiments which are for illustration only and not limitative of the scope of this invention.

Figure 1:
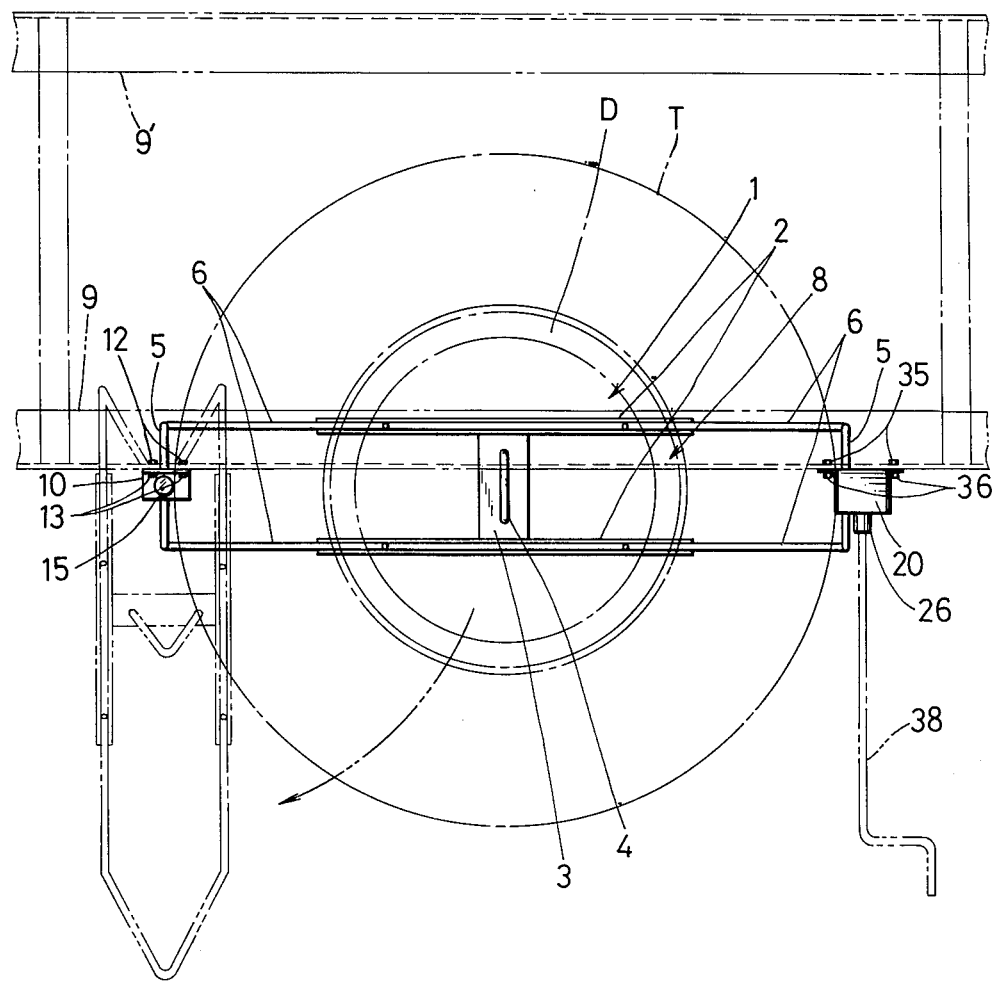
FIG. 1 is a top plan view of the apparatus embodying this invention.
Figure 2:
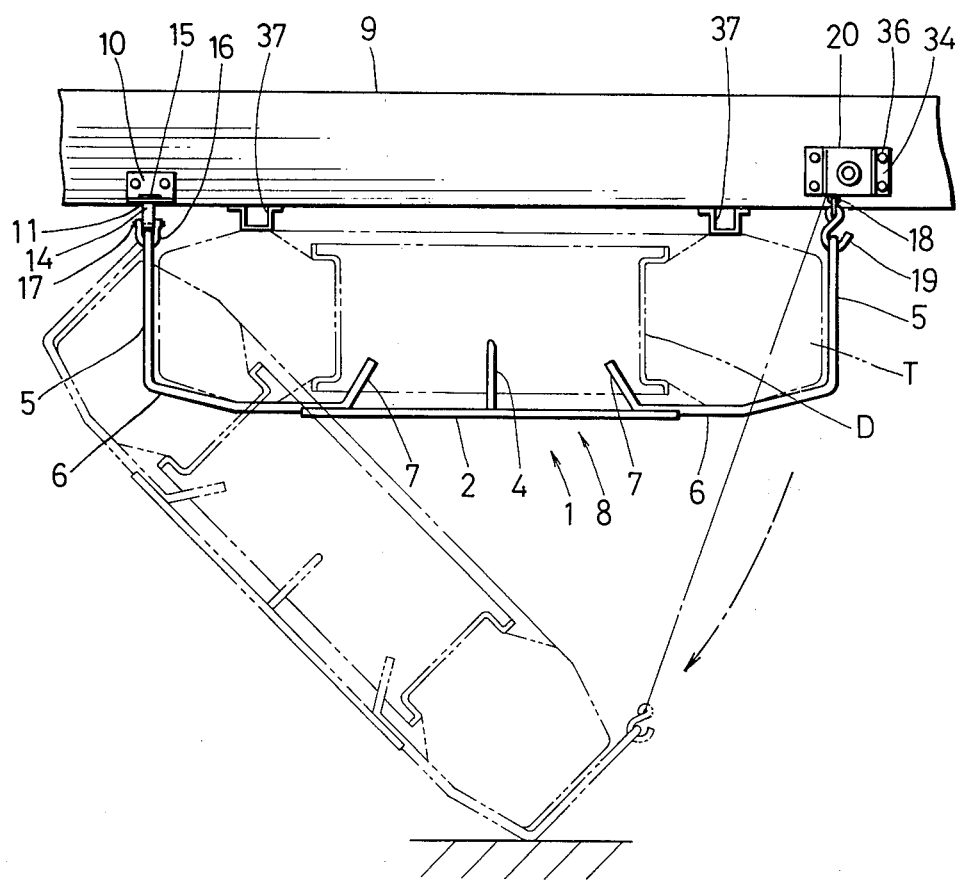
FIG. 2 is a side elevational view of the apparatus shown in FIG. 1.
Figure 3:
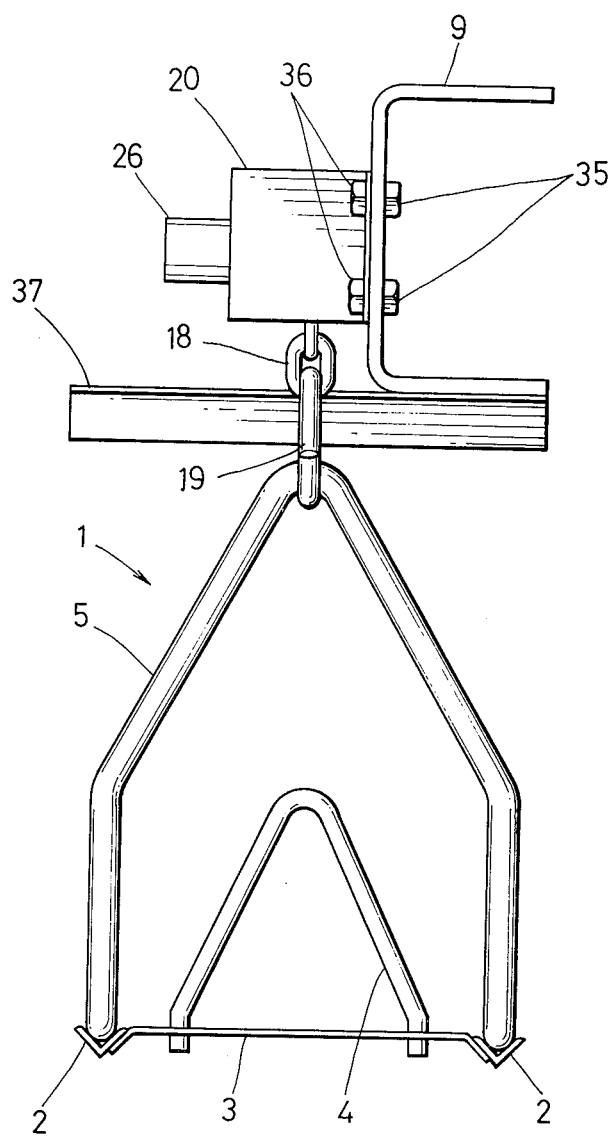
FIG. 3 is an enlarged front elevational view of the apparatus shown in FIG. 1.

Referring first to FIGS. 1 through 3 of the drawings, the spare wheel holding apparatus according to the first embodiment of this invention is supported on one of the longitudinal or side members of the chassis of a motor vehicle. The apparatus comprises an elongate wheel holder 1 extending along and under the longitudinal member 9 of the chassis. The wheel holder 1 includes a pair of parallel supporting rods 2 of V-shaped cross-section which are somewhat greater in length than the diameter of the wheel disc of a spare wheel and which are spaced apart from each other by a distance approximately equal to one-third of the wheel disc diameter. The supporting rods 2 are connected with each other by a rectangular connecting plate 3 having a pair of opposite ends bent downwardly and welded to the sides of the rods 2 in the mid-portions thereof to form an H-shaped structure as shown in FIG. 1. The connecting plate 3 is provided with an inverted V-shaped handle 4 upstanding from the longitudinal centerline thereof. The wheel holder 1 further includes a pair of upright hanging members 5 connected to the opposite ends of a supporting frame 8 formed by the H-shaped structure and a pair of generally horizontally extending, parallel tire supporting legs 6 connected between the H-shaped structure and each hanging member 5. Each hanging member 5 is formed of a bar bent in its mid-portion into an inverted V-shape as shown in FIG. 3. The hanging member 5 has a pair of vertically extending parallel portions depending from its inverted V-shaped portion. The lower ends of these vertical portions are integrally connected with the tire supporting legs 6, each hanging member 5 and each pair of tire supporting legs 6 define a substantially L-shaped configuration in side elevation as illustrated in FIG. 2. The tire supporting legs 6 are slightly curved in their mid-portions to snugly fit the tire of a spare wheel carried thereon. The ends of the tire supporting legs 6 which are remote from the hanging members 5 are received in and welded to the V-shaped grooves of the two supporting rods 2 at the opposite ends of the latter. Those ends of the tire supporting legs 6 are further bent upwardly toward the handle 4 to define two oppositely disposed pairs of obliquely extending stops 7 for holding a spare wheel in its correctly centered position. The apparatus of this invention further includes a supporting member 10 secured to the outer surface of one longitudinal or side member 9 of the chassis for supporting the wheel holder 1 rotatably at one end thereof. The supporting member 10 comprises a steel angle secured to the outer surface of the longitudinal member 9 by bolts 12 and nuts 13. The supporting member 10 has a horizontally outwardly extending portion formed therethrough with a hole 11 through which a vertically disposed pin 14 extends downwardly. The pin 14 has an enlarged flat head 15 resting on a washer on the upper surface of the horizontal portion of the supporting member 10. A U-shaped link 16 is connected to the inverted V-shaped upper extremity of one of the hanging members 5. The link 16 is pivotally fastened to the lower end of the vertical pin 14 by a horizontally disposed pin 17. Thus, the wheel holder 1 is rotatably supported at one end on the longitudinal member 9 of the chassis by the supporting member 10, the pin 14 and the U-shaped link 16, so that the wheel holder 1 is rotatable both vertically and horizontally to permit the opposite or free end of the wheel supporting frame 8 to be lowered on the ground and withdrawn outwardly of the space under the chassis.

Figure 4:
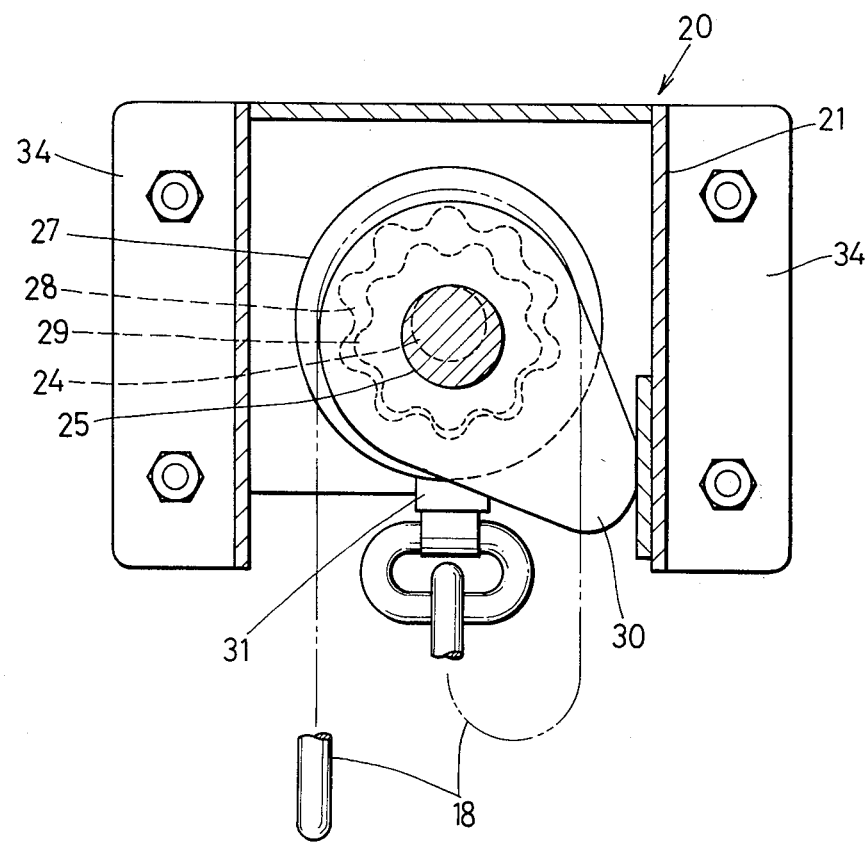
FIG. 4 is a front elevational view in vertical section of the winch mechanism employed in the apparatus of FIG. 1.
Figure 5:
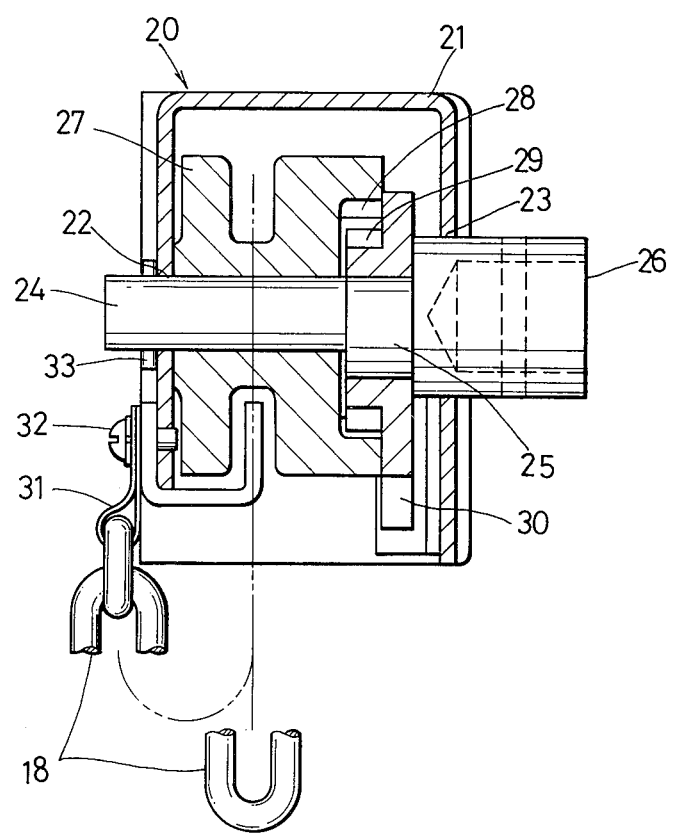
FIG. 5 is a side elevational view in vertical section of the winch mechanism shown in FIG. 4.

The apparatus further includes a reduction speed winch mechanism 20 spaced apart from the supporting member 10 by a distance corresponding to the length of the wheel holder 1 and supported on the outer surface of the longitudinal member 9 of the chassis. The winch mechanism 20 includes a chain 18 and a hook 19 fastened to the depending lower end of the chain 18 and adapted to catch hold of the upper end of the hanging member 5 remote from the supporting member 10. As shown in FIGS. 4 and 5 in detail, the winch mechanism 20 includes a casing 21 having an open bottom and secured to the outer surface of the longitudinal member 9 of the chassis. The rear wall of the casing 21 is formed therethrough with a hole 22 through which one end of a main shaft 24 extends outwardly. The front wall of the casing 21 is likewise provided therethrough with a hole 23 through which a cylindrical handle socket 26 extends outwardly. The handle socket 26 has a larger diameter than the main shaft 24 and is coaxial with the main shaft 24. The other end of the main shaft 24 is formed with an eccentric cam 25 to which the handle socket 26 is integrally connected within the casing 21. A chain wheel 27 is rotatably supported about the main shaft within the casing 21. The casing 21 also contains an externally toothed gear 29 rotatably supported by the eccentric cam 25. An internally toothed gear 28 is formed on the front end of the chain wheel 27 in integral relationship and meshes with the externally toothed gear 29 having a smaller number of teeth and a smaller diameter than the internally toothed gear 28. The externally toothed gear 29 is formed with a radially outwardly extending projection 30 which is, upon rotation of the gear 29, adapted for abutment on one of the side walls of the casing 21 to prevent further rotation of the gear 29. The chain 18 passing around the chain wheel 27 has its base end fastened to the casing 21 by a folded sheet metal clip 31 screwed down to the rear wall of the casing 21 at 32. A pin 33 extends diametrically through the main shaft 24 at its outer end externally of the rear wall of the casing 21 to prevent total withdrawal of the main shaft 24 into the casing 21. The rear end of each side wall of the casing 21 projects rearwardly beyond the rear wall and is formed with a perpendicularly outwardly bent flange 34 secured to the outer surface of the longitudinal member 9 of the chassis by bolts 35 and nuts 36 to fix the casing 21 to the longitudinal member 9. A pair of tire stops 37 are attached to the underside of the longitudinal member 9 of the chassis between and in the vicinity of the supporting member 10 and the winch mechanism 20, respectively, as shown in FIG. 2.

In order to load the apparatus hereinabove described with a spare wheel T to hold the wheel T in a horizontally suspended fashion under the chassis, the wheel holder 1 is tilted downwardly until its free end is lowered on the ground as shown in FIG. 2 by phantom lines. Then, the wheel holder 1 is rotated outwardly relative to the chassis into a position perpendicular to the longitudinal member 9 as shown in FIG. 1 by phantom lines to expose the lowered free end thereof exteriorly of the space under the chassis to provide anybody with easy access to the wheel holder 1. The spare wheel T is moved to ride on the supporting frame 8 adjacent to the lower hanging member 5 and brought down to lie on the supporting frame 8 in an oblique position. The spare wheel T is easily centered relative to the wheel holder 1 by the two pairs of stops or positioning members 7 inserted into the wheel disc D. Then, the wheel holder 1 on which the spare wheel T is supported is rotated back into its retracted position under the longitudinal member 9 of the chassis. With the free end of the wheel holder 1 now located below the winch mechanism 20, the hook 19 hanging from the chain 18 is engaged with the upper end of the hanging member 5 at the free end of the wheel holder 1. A handle 38 is engaged with the handle socket 26 and turned clockwise as viewed from the bottom of FIG. 1 to rotate the main shaft 24 and the eccentric cam 25, whereby the chain wheel 27 is rotated clockwise to haul up the chain 18. When the chain 18 is hauled up, the load bearing on the chain wheel 27 imparts a force of counterclockwise rotation to the chain wheel 27 and this force of rotation causes the projection 30 on the externally toothed gear 29 meshing with the internally toothed gear 28 integral with the chain wheel 27 to abut the inner surface of the right side wall of the casing 21 as shown in FIG. 4 to restrict rotation of the gear 29. The clockwise rotation of the eccentric cam 25 causes the externally toothed gear 29 meshing with the internally toothed gear 28 to revolve about the longitudinal axis of the main shaft 24 in a circle having a radius equal to the amount of eccentricity of the cam 25 relative to the main shaft 24. Each turn of the handle 38 that causes one rotation of the eccentric cam 25 makes one revolution of the externally toothed gear 29 to return it to its original position without bringing about its rotation around its own axis, while the internally toothed gear 28 is rotated by an angular distance corresponding to the difference in the number of teeth between the two gears 28 and 29 (one tooth in the embodiment shown in the drawings) to cause the chain wheel 27 to make one-tenth of a full rotation to raise the chain 18. When the chain 18 is thus hauled up, the hanging member 5 at the free end of the wheel holder 1 is raised to rotate the wheel holder 1 upwardly about the upper end of the other hanging member 5 connected to the pin 14 on the supporting member 10. The wheel holder 1 is, thus, lifted from its oblique position to its raised or horizontally disposed position, in which the tire of the spare wheel T on the supporting frame 8 abuts on the tire stops 37 on the underside of the longitudinal member 9 of the chassis, whereupon the chain hauling operation is discontinued. When the wheel holder 1 is brought up to its substantially horizontal position, the handle 38 is detached from the handle socket 26. It will be understood that the self-holding action of the winch mechanism 20 which is developed by the load (the weight of the spare wheel T, etc.) bearing on the chain wheel 27 through the chain 18 serves to hold the wheel holder 1 and the spare wheel T carried thereon directly below the longitudinal member 9 of the chassis.

When it is desired to detach the spare wheel T from the apparatus, the handle 38 is turned in the opposite direction, i.e., counterclockwise as viewed from the bottom of FIG. 1 to effect counterclockwise rotation of the main shaft 24 and the eccentric cam 25. This rotation of the cam 25 causes the externally toothed gear 29 meshing with the internally toothed gear 28 to revolve so as to rotate the chain wheel 27 counterclockwise, so that the chain 18 is unwound from the chain wheel 27 to tilt the wheel holder 1 downwardly. When the hanging member 5 suspended from the chain 18 is lowered on the ground, the hook 19 is disengaged from the hanging member 5. Then, the wheel holder 1 is rotated about the pin 14 to have its free end moved outwardly relative to the chassis, whereby the spare wheel T can easily be removed from the wheel holder 1.

Figure 6:
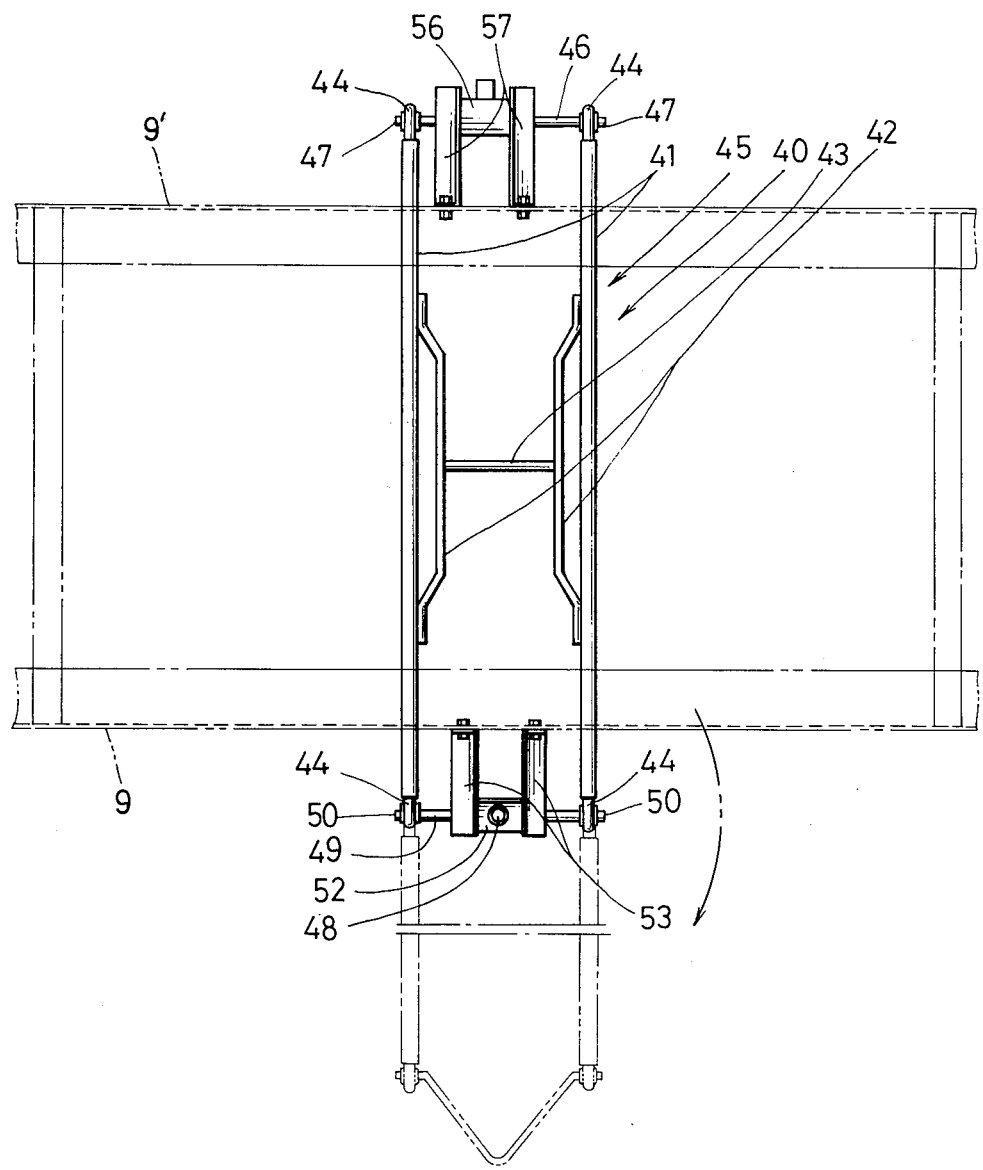
FIG. 6 is a top plan view showing another embodiment of this invention.

Attention is now directed to FIGS. 6 through 8 for description of a second embodiment of this invention. The apparatus according to this embodiment comprises a wheel holder 40 extending under the chassis of a motor vehicle perpendicularly to the two longitudinal or side members 9 and 9' thereof as shown in FIG. 6. The wheel holder 40 includes a pair of spaced-apart parallel supporting tubes 41 having a length which is nearly equal to the diameter of a spare wheel T. An obliquely extending wheel stop 42 of the generally trapezoidally curved configuration is welded to the mid-portion of each supporting tube 41. A bearing member 44 is provided at each end of each supporting tube 41. Each bearing member 44 is formed of a bar having one end welded into the end of a corresponding supporting tube 41, while the other end of the bar is curved into the shape of a ring. The two wheel stops 42 are connected to each other by a connecting rod 43 which is welded at both ends to the mid-portions of the wheel stops 42 and which defines with the supporting tubes 41 a wheel supporting frame 45 of substantially the H-shaped configuration as viewed in top plan. The wheel holder 40 further includes a pair of upright hanging members 46 and 49 of the inverted V-shaped construction provided at the opposite ends of the wheel supporting frame 45. The hanging member 46 is provided at the free end of the wheel supporting frame 45, while the other hanging member 49 is located at the fixed end of the wheel supporting frame 45 on which the frame 45 is rotatably supported. The hanging member 46 is formed of a bar bent into an inverted V shape and has a pair of free lower ends 47 curved outwardly horizontally and extending through the bearing members 44 at the free end of the wheel supporting frame 45. The other hanging member 49 is formed by a pair of trapezoidally curved bars disposed obliquely to define in combination an inverted V-shaped configuration. Each of the two bars has a horizontally outwardly bent lower end and a vertically extending upper end which is connected to the lower end by an intermediate oblique portion. The lower ends of the bars define a pair of free lower ends 50 curved horizontally outwardly extending outwardly through the bearing members 44 at the fixed end of the wheel supporting frame 45. A ring 51 encircles each of the lower ends 47 and 50 of the hanging members 46 and 49 and is fitted in the corresponding bearing member 44 to prevent unintentional detachment of the hanging member 46 or 49 from the wheel supporting frame. An upright pin 48 having an enlarged flat head is welded at its lower end to the upper end of the hanging member 49. The upper end of the hanging member 49 is formed by the vertical upper ends of the two bars which are spaced apart from each other in mutually parallel relationship. The lower end of the pin 48 is interposed between and welded to the oppositely disposed peripheral surfaces of the bars at the upper ends thereof. The head of the pin 48 rests on and is rotatably supported by an L-shaped supporting member 52 which is interposed between and secured to a pair of brackets 53 at the free ends of the latter. The brackets 53 are secured to the outer surface of the longitudinal member 9 of the chassis by bolts 54 and nuts 55. Thus, the supporting member 52 rotatably supports the pin 48 in appropriately spaced relationship from the outer surface of the longitudinal member 9 of the chassis as best shown in FIG. 7. The wheel supporting frame 45 is rotatable downwardly about the lower ends 50 of the hanging member 49 to lower its free end on the ground as shown in FIG. 7 by phantom lines, whereupon the hanging member 46 on the free end of the wheel supporting frame 45 is rotatable downwardly to lie horizontally on the ground.

The apparatus further includes a reduction speed winch mechanism 56 carried by a pair of brackets 57 and spaced apart from the pin 48 by a distance substantially equal to the length of the wheel supporting frame 45. The brackets 57 are spaced apart from each other, so that the winch mechanism 56 is interposed between the brackets 57. The brackets 57 are secured to the outer surface of the longitudinal or side member 9' of the chassis which is opposite to the longitudinal member 9 on which the pin 48 is supported by the supporting member 52 and the brackets 53. The winch mechanism 56 is supported in the vicinity of the free ends of the brackets 57. Thus, the wheel holder 40 of this embodiment extends transversely across the chassis. The winch mechanism 56 includes a chain 60, a coiled spring 61 fastened to the lower end of the chain 60 and a hook 62 depending from the spring 61. The hook 62 is adapted to catch hold of the upper end of the hanging member 46 at the free end of the wheel supporting frame 45 as shown in FIG. 7.

While the wheel holder 1 in the apparatus of FIGS. 1 through 3 is rotated by about 90° after its free end is lowered on the ground, it will be noted that the wheel holder 40 shown in FIGS. 6 through 8 is rotatable by 180° to project outwardly of the chassis for loading or unloading a spare wheel T. The apparatus of FIGS. 6 through 8 holds a spare wheel T under the chassis in a position perpendicular to the longitudinal members 9 and 9', while the apparatus of FIGS. 1 through 3 supports the wheel T under and along one longitudinal member 9 of the chassis. The apparatus of FIGS. 6 through 8 is advantageous, as compared with that of FIGS. 1 through 3, in that when it is loaded or unloaded, the hanging member 46 on the free end of the wheel holder 40 is rotatable to lie on the ground as shown in FIG. 7 to facilitate its loading and unloading operation. The apparatus of FIGS. 6 through 8 is used or operated in a manner similar to the apparatus of FIGS. 1 through 3 unless specifically noted herein; therefore, no further description relative to the operation of the second embodiment would be necessary to anybody of ordinary skill in the art.

As hereinabove described in detail, this invention is particularly featured by a wheel holder having one end rotatably supported by a vertical pin depending from a supporting member on the outer surface of a longitudinal chassis member, with the other or free end of the wheel holder being vertically movable, so that the wheel holder is tiltable to rest obliquely on the ground and horizontally rotatable to project outwardly relative to the chassis. According to this invention, therefore, easy access is obtainable to the wheel holder whenever it is to be loaded with a spare wheel or unloaded, to ensure easier handling of a spare wheel for a motor vehicle than by any apparatus of this sort known in the art, while the apparatus of this invention has a simple construction no more complicated than any known apparatus. It will also be observed that the apparatus of FIGS. 6 through 8 is particularly useful for holding a heavy truck wheel.

While the invention has been described with reference to a couple of embodiments thereof, it is to be expressly understood that further modifications or variations may be easily made by anybody of ordinary skill in the art without departing from the spirit and scope of this invention as defined by the appended claims. For instance, while in both of the embodiments hereinabove described planetary gearing has been employed for the winch mechanism, it will readily be understood that it is equally possible to use a mechanism having a worm wheel.

What is claimed is:

1. An apparatus for holding a spare wheel under the chassis of a motor vehicle, said chassis having two longitudinal members, said apparatus comprising:

an elongated wheel supporting frame adapted to be positioned perpendicularly to said longitudinal chassis members to support said spare wheel horizontally thereon;

a pair of vertically disposed hanging members connected at their lower ends to the opposite ends of said wheel supporting frame to form therewith a wheel holder which is rotatable about one end both vertically and horizontally to move its other end vertically and horizontally;

a supporting member secured to the outer surface of one of said longitudinal chassis members;

a vertical pin pivotally depending from said supporting member and secured to one end of one of said hanging members for rotating said wheel holder horizontally;

means provided between said one hanging member and said wheel supporting frame for rotating said wheel holder vertically;

means provided between the other hanging member and said wheel supporting frame for rotating said other hanging member vertically; and means provided on the outer surface of the other longitudinal chassis member for moving said other end of said wheel holder vertically between an upper position adjacent to said chassis and a lower position on the ground, wherein said wheel holder can be moved to a position below and outside of the motor vehicle.

2. The apparatus as defined in claim 1, wherein said last mentioned means comprises a reduction speed winch mechanism carried on said outer surface of said longitudinal chassis member.

3. The apparatus as defined in claim 2, further including a bracket secured to said outer surface of said other longitudinal chassis member for supporting said winch mechanism.

4. The apparatus as defined in claim 2, wherein said winch mechanism includes a vertically movable depending elongated flexible member, a vertically disposed coiled spring fastened to the lower end of said elongated flexible member and a connecting member connected to the lower end of said spring for catching hold of the upper end of said other hanging member.

5. The apparatus as defined in claim 4, wherein said connecting member comprises a hook.

6. The apparatus as defined in claim 1, further including a bracket secured to said outer surface of said one longitudinal chassis member for supporting said vertical pin supporting member outwardly of said last mentioned outer surface.

7. The apparatus as defined in claim 1, wherein said one hanging member is of the inverted V-shaped construction having a pair of free lower ends; and wherein said wheel holder vertically rotating means comprises a pair of bearing members connected to said wheel supporting frame and receiving said lower ends of said one hanging member for supporting said wheel supporting frame vertically rotatably relative to said one hanging member.

8. The apparatus as defined in claim 1, wherein said other hanging member is of the inverted V-shaped construction having a pair of free lower ends; and wherein said other hanging member vertically rotating means comprises a pair of bearing members connected to said wheel supporting frame and receiving said lower ends of said other hanging member for supporting said other hanging member vertically rotatably relative to said wheel supporting frame.

* * * * *